United States Patent [19]
Dobson et al.

[11] Patent Number: 5,804,535
[45] Date of Patent: Sep. 8, 1998

[54] WELL DRILLING AND SERVICING FLUIDS AND METHODS OF INCREASING THE LOW SHEAR RATE VISCOSITY THEREOF

[75] Inventors: James W Dobson, Houston; James P Cashion, Missouri City; Brandon B Bellew, Houston, all of Tex.

[73] Assignee: Texas United Chemical Company, LLC., Houston, Tex.

[21] Appl. No.: 871,389

[22] Filed: Jun. 9, 1997

[51] Int. Cl.⁶ ........................................ C09K 7/02
[52] U.S. Cl. ................... 507/111; 507/140; 507/141; 507/145; 507/212; 507/276; 507/277
[58] Field of Search ................... 507/111, 140, 507/141, 145, 212, 276, 277

[56] References Cited

U.S. PATENT DOCUMENTS

| | | | |
|---|---|---|---|
| 4,090,968 | 5/1978 | Jackson et al. | 507/111 |
| 4,440,649 | 4/1984 | Loftin et al. | 507/111 |
| 4,822,500 | 4/1989 | Dobson, Jr. et al. | 507/111 |
| 4,900,457 | 2/1990 | Clarke-Sturman | 507/111 |
| 5,616,541 | 4/1997 | Dobson, Jr. et al. | 507/111 |
| 5,629,271 | 5/1997 | Dobson, Jr. et al. | 507/140 |
| 5,641,728 | 6/1997 | Dobson, Jr. et al. | 507/111 |

*Primary Examiner*—Philip Tucker
*Attorney, Agent, or Firm*—Roy F. House

[57] ABSTRACT

A well drilling and servicing fluid comprising a brine having dissolved therein a formate salt selected from the group consisting of potassium formate, cesium formate, and mixtures thereof, a biopolymer viscosifier, and a pre-gelatinized amylopectin derivative, and optionally a bridging agent and magnesium oxide. The amylopectin starch derivative is a crosslinked amylopectin starch (waxy) which has been crosslinked to the extent that the viscosity of an aqueous amylopectin starch suspension undergoing crosslinking is within about 25% to about 60%, preferably from about 25% to less than about 50%, of the maximum viscosity which can be obtained, and gelatinized.

A process of increasing the low shear rate viscosity at ambient temperatures of the aqueous formate brine which comprises adding to the brine a biopolymer and the pre-gelatinized crosslinked amylopectin starch in amounts such that they interact to synergistically increase the low shear rate viscosity of the brine.

16 Claims, No Drawings

WELL DRILLING AND SERVICING FLUIDS AND METHODS OF INCREASING THE LOW SHEAR RATE VISCOSITY THEREOF

PRIOR ART

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores. This is particularly critical in conducting horizontal drilling operations within hydrocarbon-containing formations.

Many clay-free fluids have been proposed for contacting the producing zone of oil and gas wells. See for example the following U.S. Patents: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine U.S. Pat. No. 4,186,803; Mondshine U.S. Pat. No. 4,369,843; Mondshine U.S. Pat. No. 4,620,596; Dobson, Jr. et al. U.S. Pat. No. 4,822,500, and Johnson U.S. Pat. No. 5,504,062.

These fluids generally contain polymeric viscosifiers such as certain polysaccharides or polysaccharide derivatives, polymeric fluid loss control additives such as lignosulfonates, polysaccharides or polysaccharide derivatives, and bridging solids. As disclosed in Dobson, Jr. et al. U.S. Pat. No. 4,822,500, a xanthan biopolymer and an epichlorohydrin crosslinked hydroxypropyl starch fluid loss control additive synergistically interact to provide suspension and fluid loss control in certain of these fluids.

Clarke-Sturman U.S. Pat. No. 4,900,457 discloses the use of formate salts to enhance the thermal stability of certain aqueous polysaccharide-containing solutions.

Magnesium oxide has been disclosed for use in various polysaccharide-containing fluids to increase the thermal stability thereof. See for example the following U.S. patents: Jackson U.S. Pat. No. 3,852,201; Jackson U.S. Pat. No. 3,953,335; Hartfield U.S. Pat. No. 3,988,246; Jackson U.S. Pat. No. 4,025,443; and Dobson, Jr. U.S. Pat. No. 5,514,644.

The following papers all discuss the use of formate brines in drilling and completion fluids: (1) "Formate Brines: New Solutions to Deep Slim-Hole Drilling Fluid Design Problems", J. D. Downs, SPE (Society of Petroleum Engineers) Paper No. 24973, 1992; (2) "Laboratory Development and Field Testing of Succinoglycan as Fluid-Loss Control Fluid," H. C. Lau, SPE Paper No. 26724, 1993; (3) "Development of Environmentally Benign Formate-Based Drilling and Completion Fluids", J. D. Downs et al., SPE Paper No. 27143, 1994; (4) "Formate Brines for Drilling and Completion: State of the Art", S. K. Howard, SPE Paper No. 30498, 1995; (5) "Cesium Formate: Results and Analysis of Drilling with a New High Density Unweighted Brine", M. S. Ramsey et al., SPE Paper No. 36425, 1996; (6) "Scleroglucan Biopolymer Enhances WBM Performances", G. Gallino et al., SPE Paper No. 36426, 1996; (7) "Formate Brines-New Fluids for Drilling and Completion", M. S. Ramsey et al., Petroleum Engineer International, Jan. 1996, pp. 33–37; (8) "Use of Formate-Based Fluids for Drilling and Completion," John H. Hallman, Offshore, Aug. 1996, pp. 63, 64, 82, 84; and (9) "New High-Density Unweighted Brine", Journal of Petroleum Technology, Nov. 1996, pp. 1045–1046. These references disclose brine-based fluids having dissolved therein, up to saturation, of sodium formate, potassium formate, and cesium formate. Viscosifiers disclosed for use therein are certain polysaccharides such as the biopolymers xanthan gum and scleroglucan gum. Fluid loss control additives for use therein are various cellulose and starch derivatives.

It is well known that certain biopolymer-containing fluids are shear thinning, exhibiting a high low shear rate viscosity and a low high shear rate viscosity. A near zero shear rate (0.06 to 0.11 $sec^{-1}$) viscosity provides a numerical value related to the ability of a fluid to suspend particles or cuttings under static conditions. Conversely, viscosity measured at shear rates above 20 $sec^{-1}$ relates to the hole cleaning capability of a fluid under annular flow conditions. Such fluids have been eminently successful for use in high angle and horizontal drilling. See for example: (1) "Drill-In Fluids Improve High-Angle Well Production", Supplement to Petroleum Engineer International, March, 1995, p. 5–11; and (2) "Soluble Bridging Particle Drilling System Generates Successful Completions in Unconsolidated Sand Reservoirs," J. Dobson and D. Kayga, presented at the 5th International Conference on Horizontal Well Technology, Amsterdam, The Netherlands, Jul. 14–16, 1993.

There is a need in the well drilling and servicing industry for improved shear thinning fluids characterized by a high low shear rate viscosity (LSRV) and a low fluid loss.

SUMMARY OF THE INVENTION

The invention provides well drilling and servicing fluids comprising an aqueous brine having dissolved therein a formate salt selected from the group consisting of potassium formate, cesium formate, and mixtures thereof, a biopolymer viscosifier, and a particular modified starch. The modified starch comprises amylopectin, such as a waxy starch, that has been crosslinked to the extent that the viscosity of a basic aqueous amylopectin starch suspension undergoing crosslinking is within about 25% to about 60% of the maximum viscosity that can be obtained, preferably from about 25% to less than about 50%, and pre-gelatinized. The crosslinked amylopectin interacts with the biopolymer to synergistically increase the low shear rate viscosity of the fluids and decrease the fluid loss thereof.

The invention further comprises a method of increasing the low shear rate viscosity at ambient temperatures of an aqueous brine having dissolved therein a formate salt selected from the group consisting of potassium formate, cesium formate, and mixtures thereof, which comprises adding to the brine a biopolymer and amylopectin which has been modified by crosslinking to the extent that the viscosity of a basic aqueous amylopectin starch suspension undergoing crosslinking is within about 25% to about 60% of the maximum viscosity which can be obtained, preferably from about 25% to less than about 50%, and pre-gelatinized. The low shear rate viscosity at ambient temperatures can be further enhanced by the addition of magnesium oxide to the brine.

It is therefore an object of this invention to provide a method of increasing the low shear rate viscosity at ambient temperatures of aqueous potassium formate-containing and cesium formate-containing brines.

It is another object of this invention to provide a method of increasing the low shear rate viscosity of aqueous potassium formate-containing and cesium formate-containing brines which does not require long mixing times and elevated temperatures to accomplish the low shear rate viscosity increase.

Still another object of the invention is to provide shear thinning well drilling and servicing fluids comprising a biopolymer and a particular pre-gelatinized crosslinked amylopectin (waxy) starch in a potassium formate-containing or cesium formate-containing brine, such fluids being characterized by an elevated low shear rate viscosity and low fluid loss before subjecting the fluids to an elevated temperature.

A further object of the invention is to increase the low shear rate viscosity of aqueous brines comprising a formate salt selected from the group consisting of potassium formate, cesium formate, and mixtures thereof, which comprises adding to the brine a biopolymer and a particular pre-gelatinized crosslinked amylopectin starch whereby the biopolymer and the starch synergistically interact to increase the low shear rate viscosity of the brine.

Other objects and the several advantages of the present invention will become apparent to those skilled in the art upon a reading of the specification and the claims appended thereto.

While the invention is susceptible to various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE INVENTION

The present invention is based on the discovery that biopolymer viscosifiers known in the art to increase the viscosity of formate-salt containing brines do not produce fluids which exhibit significant shear thinning characteristics until the fluids are subjected to elevated temperatures.

We have now found that well drilling and servicing fluids comprising a biopolymer viscosifier in an aqueous brine having dissolved therein a formate salt selected from the group consisting of potassium formate, cesium formate, and mixtures thereof, exhibit excellent shear thinning characteristics at ambient temperatures, without first subjecting the fluids to elevated temperatures, by incorporating in the fluids a particular pre-gelatinized crosslinked amylopectin starch as hereinafter described, and, optionally, magnesium oxide. The modified amylopectin starch not only synergistically increases the low shear rate viscosity of the fluids, thus enhancing the shear thinning characteristics of the fluids, it also decreases the fluid loss of the fluids.

The biopolymer viscosifier useful in the practice of this invention is preferably a xanthomonas gum (xanthan gum). Xanthomonas gum is available commercially. It is a widely used viscosifier and suspending agent in a variety of fluids, Xanthomonas gum can be made by the fermentation of carbohydrate with bacteria of the genus Xanthomonas. Representative of these bacteria are *Xanthomonas campestris, Xanthomonas phaseoli, Xanthomonas mulvacearn, Xanthomonas carotoe, Xanthomonas traslucens, Xanthomonas hederae*, and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and difference in processing operation subsequent to fermentation, different production lots of xanthomonas gum will have somewhat different solubility and viscosity properties. Xanthomonas gums useful in the practice of the present invention are relatively hydratable xanthomonas gums.

The colloid is a polymer containing mannose, glucose, glucuronic acid salts such as potassium glucuronate, sodium glucuronate, or the like, and acetyl radicals. Other Xanthomonas bacteria have been found which produce the hydrophilic gum and any of the xanthan gums and their derivatives can be used in this invention. Xanthan gum is a high molecular weight linear polysaccharide that is readily soluble in water to form a viscous fluid.

Other biopolymers prepared by the action of other bacteria, or fungi, on appropriate fermentation mediums may be used in the fluids of the present invention provided that they impart the desired synergistic Theological characteristics thereto. This can be readily determined by one skilled in the art in accordance with the teachings of this specification.

The term "biopolymer" is intended to mean an excellular polysaccharide of high molecular weight, generally in excess of 500,000, produced by fermentation of a carbohydrate source by the action of bacteria or fungi. Representative microorganisms are the genus Xanthomonas, Pseudomonas, Agrobacterium, Arthrobacter, Rhizobium, Alcaligenes, Beijerincka, and Sclerotium. A succinoglucan type polysaccharide produced by microorganisms such as NCIB 11592 and NCIB 11883 is commercially available.

Starch is a natural polymer containing an abundance of hydroxyl groups. Each anhydroglucose unit contains two secondary hydroxyls and a large majority contain primary hydroxyls. These hydroxyls potentially are able to react with any chemical capable of reacting with alcoholic hydroxyls. This would include a wide range of compounds such as acid anhydrides, organic chloro compounds, aldehydes, epoxy, ethylenic compounds, etc. When the specified chemical contains two or more moieties capable of reacting with hydroxyl groups, there is the possibility of reacting two different hydroxyls resulting in crosslinking between hydroxyls on the same molecule or on different molecules.

The chemistry of starch and the preparation of a multitude of derivatives thereof is well known. A book entitled "Modified Starches: Properties and Uses," by O. B. Wurzburg, 1986 (CRC Press, Inc., Boca Raton, Fla, U.S.A.) is an excellent source for information in the preparation of modified starches. In regards to the preparation of the crosslinked starches of this invention, the chapter entitled "Crosslinked Starches" is particularly pertinent.

Representative crosslinking materials are epichlorohydrin and other epihalohydrins, formaldehyde, phosphorous oxychloride, trimetaphosphate, dialdehydes, vinyl sulfone, diepoxides, diisocyanates, bis(hydroxymethyl) ethylene urea, and the like. The preferred crosslinking compound is epichlorohydrin.

Crosslinking of the starch results in an increase in the molecular weight of the starch and an increase in the viscosity of aqueous dispersions of the starch.

The reaction conditions used in making crosslinked starches vary widely depending upon the specific bi-or polyfunctional reagent used for the crosslinking. In general, most of the reactions are run on aqueous suspensions of starch at temperatures ranging from room temperature up to about 50° C. Often an alkali such as sodium hydroxide is used to promote reaction. The reactions are normally run under neutral to fairly alkaline conditions, but below the level which will peptize or swell the starch. If the crosslinking reaction is run in an aqueous suspension of starch, when the desired level of crosslinking (usually as measured by some type of viscosity or rheology test) is reached, the starch suspension is neutralized and the starch is filtered and washed to remove salts, any unreacted reagent, and other impurities produced by side reactions of the crosslinking reagent with water. Konigsberg U.S. Pat. No. 2,500,950 discloses the crosslinking of starch with epoxyhalogen compounds such as epichlorohydrin.

It is preferred that the amylopectin starch for use in the present invention be crosslinked with epichlorohydrin in a basic aqueous starch suspension at a temperature and for a period of time such that the Brabander viscosity of the suspension is within about 25% to about 60% of the maximum attainable viscosity, preferably from about 25% to less than about 50% of the maximum attainable viscosity. The viscosity will vary by the amount of crosslinking and the test conditions, i.e., temperature, concentrations, etc. A viscosity peak indicates maximum crosslinking. When the desired viscosity is reached, the crosslinking reaction is terminated. A Brabender Viscometer is a standard viscometer readily available on the open market and well known to those skilled in the art.

As indicated, the crosslinked amylopectin starch of this invention is pre-gelatinized. The term "gelatinization" is well known in the art and is generally used to describe the swelling and hydration of starches. Starch granules are insoluble in cold water but imbibe water reversibly and swell slightly. However, in hot water, a large irreversible swelling occurs producing gelatinization. Gelatinization takes place over a discrete temperature range that depends on starch type. Since gelatinization increases the viscosity of a starch suspension, the gelatinization of the starch is preferably conducted after the amylopectin starch is crosslinked to the desired extent as indicated herein. Certain chemicals increase the gelatinization temperature range of starches and thus such chemicals can be present during the crosslinking of the amylopectin in order that the crosslinking temperature can be increased without gelatinization of the starch occurring. The term "pre-gelatinized" indicates that the crosslinked amylopectin has been gelatinized such that the crosslinked amylopectin does not undergo gelatinization upon adding it to the formate brines of the present invention.

The crosslinked amylopectin is normally gelatinized by heating the crosslinked amylopectin at a temperature above the gelatinization temperature, such as during drying of the crosslinked starch slurry.

As indicated, the pre-gelatinized crosslinked amylopectin for use in the present invention is preferably derived from a waxy starch, preferably waxy corn (maize) starch. As is known, waxy starches are virtually all amylopectin whereas common starches contain both amylose and amylopectin molecules. For the purposes of disclosing and claiming this invention, the amylopectin contains less than about 10% by weight amylose, preferably not more than about 5% amylose.

Formate brines are well known in the well drilling and servicing fluid art as the references cited hereinbefore indicate. Commercially available are brines containing sodium formate, potassium formate, or cesium formate. The solubility of the formates increases in the order sodium formate<potassium formate<cesium formate. Thus the density of brines saturated with the formates decreases in the order cesium formate >potassium formate>sodium formate. The brines which can be used in the present invention have dissolved therein potassium formate, cesium formate, or mixtures thereof We have found that brines containing appreciable concentrations of sodium formate dissolved therein do not exhibit the enhanced shear thinning characteristics desired at ambient temperatures upon mixing the biopolymer and the pre-gelatinized crosslinked amylopectin starch therein.

The formate brines may contain other compatible water soluble salts therein. The term "compatible" as used herein in regards to the present invention refers to a salt which does not result in precipitate formation in the brine and/or which does not prevent the disclosed pre-gelatinized crosslinked amylopectin starch from synergistically interacting with the biopolymer at ambient temperatures.

The fluids of this invention may contain other functional additives to impart specific properties to the fluids. Thus the fluids may contain bridging agents, weight materials (which may function as bridging agents in an appropriate particle size range), corrosion inhibitors, anti-oxidants, oxygen scavengers, reducing agents, supplemental fluid loss control additives, supplemental viscosifiers, and the like.

It is preferred that the fluids of this invention have a bridging agent incorporated therein. The bridging agents useful in this invention are well known in the art. They are solid, particulate, water soluble salts or acid soluble materials the particles of which have been sized to have a particle size distribution sufficient to seal off the pores of the formations contacted by the well drilling and servicing fluid. The bridging agent must not be appreciably soluble in the liquid used to prepare the fluid. Representative water soluble salts include potassium chloride and potassium formate. Representative acid soluble materials include calcium carbonate, dolomite (calcium/magnesium carbonate), iron carbonate, and other carbonates. The preferred bridging agents are potassium chloride and calcium carbonate. The particle size distribution of the bridging agent must be sufficient to bridge across and seal the pores in the subterranean formation contacted by the fluid.

Optionally, the fluids of this invention may contain magnesium oxide. We have found that the addition of magnesium oxide to the fluids additionally enhances the synergistic interaction between the biopolymer and the pre-gelatinized crosslinked amylopectin starch to significantly increase the low shear rate viscosity of the fluids at ambient temperatures.

The fluids may be prepared and the method of the invention practiced, by mixing the formate brine with the biopolymer and the pre-gelatinized crosslinked amylopectin starch at ambient temperature. It is preferred that the optional magnesium oxide and bridging agent be added after the biopolymer and pre-gelatinized crosslinked amylopectin starch have been mixed with the formate brine. Of course, the formate brine and hence the well drilling and servicing fluids prepared therefrom can be at a temperature above ambient, although it is a feature of this invention that such elevated temperatures are not necessary for the synergistic interaction of the biopolymer and the pre-gelatinized crosslinked amylopectin starch to occur such that the fluids exhibit shear thinning, elevated low shear rate viscosity.

The concentrations of the biopolymer and the pre-gelatinized crosslinked amylopectin starch in the fluids of this invention must be sufficient to provide the fluids with the desired rheological and fluid loss control characteristics, generally as follows:

|  | Useful Concentration | | Preferred Concentration | |
|---|---|---|---|---|
|  | kg/m$^3$ | lbm/bbl | kg/m$^3$ | lbm/bbl |
| Modified Amylopectin | 5.7–42.8 | 2–15 | 11.4–28.5 | 4–10 |
| Biopolymer | 1.4–11.4 | 0.5–4 | 1.4–5.7 | 0.5–2 |
| Bridging Agent | 0–286 | 0–100 | 0–200 | 0–70 |
| Magnesium Oxide | 0–14.3 | 0–5 | 0–5.7 | 0–2 |

The preferred fluids of this invention are characterized as having a Low Shear Rate Viscosity of at least 10,000 centipoise, a Spurt Loss no greater than about 3 cubic centimeters, and a thirty (30) minute Fluid Loss less than about 10 cubic centimeters. Preferably the low shear rate viscosity of the fluids after aging the fluids as 121° C. for 16 hours will be less than about 150% of the low shear rate viscosity exhibited by the fluid prior to such aging. The Low Shear Rate Viscosity (LSRV) for purposes of this invention is obtained using a Brookfield Model LVTDV-I viscometer having a number of 2 or 3 spindle at 0.3 revolutions per minute (shear rate of 0.063 sec$^{-1}$). The LSRV is indicative of the suspension properties of the fluid, the larger the LSRV, the better is the suspension of solids in the fluid. The Spurt Loss and Fluid Loss for purposes of this invention are obtained by a modified API filtration test. Thus to an API high temperature filtration cell with removable end cages is added a ceramic disk having 5 micron openings saturated with water. The fluid to be tested is poured along the inside edge of the filtration cell. The filtration test is then conducted for 30 minutes at the desired temperature of 165.5° C. (330° F.) under a pressure differential of 17.59 kg/cm$^2$ (250 pounds per square inch) supplied by nitrogen. The spurt loss is measured as the amount of fluid expelled from the filtration cell until the flow of fluid is reduced to drops. The fluid loss is measured as the total amount of fluid collected in 30 minutes.

In order to more completely describe the invention, the following nonlimiting examples are given. In these examples and this specification, the following abbreviations may be used: API=American Petroleum Institute; NC=no control, complete loss of fluid; No. =number; sec.=seconds; lbm/gal=pounds per U.S. gallon; lbm/bbl=pounds per 42 gallon barrel; cm=centimeter; m=meter; °C.=degrees Centigrade; °F.=degrees Fahrenheit; Pa=pascal; cp=centipoise; kg=kilograms; cp=centipoise; rpm=revolutions per minute; HR=hot rolled; LSRV=Brookfield low shear rate viscosity at 0.3 revolutions per minute, 0.06 sec$^{-1}$, in centipoise; PXLWCS=pre-gelatinized crosslinked waxy corn starch of this invention.

In the examples, starch derivatives no. 1, 2, 3 and 4 are not examples of the invention, and are evaluated for comparison purposes only.

EXAMPLE 1

A pre-gelatinized epichlorohydrin crosslinked waxy corn starch, modified such that the Brabender viscosity of the alkaline waxy corn starch suspension undergoing crosslinking is greater than 25% and less than 50% of the maximum attainable viscosity in the suspension, was dispersed, by mixing at room temperature, into a 1440 kg/m3 (12.0 lbm/gal) potassium formate brine at a concentration of 64 kg/m$^3$ (22.4 lbm/bbl). The LSRV was obtained. Thereafter the brine was hot rolled for 16 hours at 121° C., cooled to room temperature, and the LSRV again obtained. Four commercially-obtained starch derivatives (not examples of this invention) were also evaluated for comparison. The data are set forth in Table 1. The data indicate that the modified waxy starch of the present invention significantly increased the LSRV of the brine at ambient temperature and did not require elevated temperature for its hydration.

TABLE 1

Evaluation of Various Modified Starches in a 1440 kg/m$^3$ (12.0 lbm/gal) Potassium Formate Brine

|  | LSRV, cp. | |
|---|---|---|
| Starch, 64 kg/m$^3$ | Initial | HR @ 121° C. |
| PXLWCS* | 208,000 | 150,000 |
| Derivative No. 1 | 7,000 | 250,000 |
| Derivative No. 2 | 500 | 312,000 |
| Derivative No. 3 | 500 | 52,000 |
| Derivative No. 4 | 400 | 2,700 |

*PXLWCS = the pre-gelatinized crosslinked waxy corn starch of this invention.

EXAMPLE 2

A xanthan gum biopolymer was dispersed, by mixing at room temperature, into a 1440 kg/m$^3$ (12.0 lbm/gal) potassium formate brine at a concentration of 2.86 kg/m$^3$ (1.0 lbm/bbl). The LSRV of the fluid was obtained. Thereafter the fluid was hot rolled at 121° C. for 16 hours, cooled to ambient temperature, mixed, and the LSRV again evaluated. The pre-gelatinized crosslinked waxy corn starch of this invention, Example 1, and the commercially-obtained starch derivatives set forth in Example 1 were similarly evaluated at a concentration of 22.86 kg/m$^3$ (8 lbm/bbl). Fluids containing both 2.86 kg/m$^3$ (1.0 lbm/bbl) of the biopolymer and 22.86 kg/m$^3$ (8 lbm/bbl) of the modified starches were also prepared and evaluated. The data obtained are set forth in Table 2. The data indicate that the pre-gelatinized crosslinked amylopectin (waxy) starch of the present invention synergistically interacted with the xanthan gum biopolymer at ambient temperature to significantly increase the low shear rate viscosity and the high shear rate viscosity of the fluid. The data also indicate that the fluid of this invention, Fluid No. 3, had excellent thermal stability and did not require an elevated temperature to obtain an enhanced low shear rate viscosity.

TABLE 2

| Fluid | Biopolymer kg/m$^3$ | Starch | Starch kg/m$^3$ | LSRV(×10$^{-3}$), cp | | |
|---|---|---|---|---|---|---|
|  |  |  |  | Initial | HR* | %** |
| 1 | 2.86 | None | 0 | 6.0 | 1.5 | −25 |
| 2 | 0 | PXLWCS | 22.86 | 0.7 | 0.4 | −57 |
| 3 | 2.86 | PXLWCS | 22.86 | 22.0 | 18.5 | −84 |
| 4 | 0 | Derivative No. 1 | 22.86 | 0.2 | 1.0 | +500 |
| 5 | 2.86 | Derivative No. 1 | 22.86 | 13.7 | 33.7 | +246 |
| 6 | 0 | Derivative No. 2 | 22.86 | 0.2 | 0.7 | +350 |
| 7 | 2.86 | Derivative No. 2 | 22.86 | 7.8 | 26.2 | +336 |

TABLE 2-continued

| | Biopolymer | | Starch | | LSRV(×10$^{-3}$), cp | |
|---|---|---|---|---|---|---|
| Fluid | kg/m$^3$ | Starch | kg/m$^3$ | Initial | HR* | %** |
| 8 | 0 | Derivative No. 3 | 22.86 | 0.4 | 1.0 | +250 |
| 9 | 2.86 | Derivative No. 3 | 22.86 | 8.3 | 13.1 | +158 |
| 10 | 0 | Derivative No. 4 | 22.86 | 0.7 | 1.7 | +243 |
| 11 | 2.86 | Derivative No. 4 | 22.86 | 11.5 | 21.4 | +186 |

*HR = After hot rolling at 121° C. for 16 hours
** = LSRV after hot rolling as a percentage of the LSRV before hot rolling

EXAMPLE 3

Fluids containing 2.86 kg/m$^3$ xanthan gum, 22.86 kg/m$^3$ pre-gelatinized crosslinked waxy corn starch (as in Example 1), and 180 kg/M$^3$ of a calcium carbonate bridging agent were prepared in a 1440 kg/m$^3$ potassium formate brine. The LSRV and fluid loss were evaluated initially and after hot rolling the fluids at 121° C. for 16 hours. The starch derivatives, not an example of the invention, were similarly evaluated. The data obtained are set forth in Table 3.

TABLE 3

2.86 kg/m$^3$ Biopolymer, 22.8 kg/m$^3$ Starch, 180 kg/m$^3$ Bridging Agent

| | | LSRV (×10$^{-3}$), cp | | Fluid Loss, ml | | | |
|---|---|---|---|---|---|---|---|
| | | | | Initial | | HR @ 121° C. | |
| Fluid | Starch | Initial | HR @ 121° C. | Spurt | Total | Spurt | Total |
| 1 | PXLWCS | 30.7 | 43.2 | 1.0 | 3.0 | 3.0 | 7.5 |
| 2 | Derivative No. 1 | 27.5 | 65.6 | 6.0 | 10.0 | 9.0 | 13.0 |
| 3 | Derivative No. 2 | 9.4 | 76.2 | 10.0 | 14.0 | 2.0 | 6.5 |
| 4 | Derivative No. 3 | 8.2 | 48.5 | 10.0 | 12.5 | 3.0 | 8.5 |
| 5 | Derivative No. 4 | 24.6 | 60.3 | 12.0 | 15.5 | 5.0 | 12.0 |

The data illustrates the superior low shear rate viscosity, fluid loss control, and thermal stability of the fluids of this invention, and indicates that the biopolymer and the pre-gelatinized, crosslinked amylopectin starch of this invention enhanced the low shear rate viscosity of the fluid.

EXAMPLE 4

The pre-gelatinized crosslinked waxy corn starch of this invention, Example 1, was dispersed at 64 kg/m$^3$ (22.4 lbm/bbl) in potassium formate brines having densities of 1380 kg/m$^3$ (11.5 lbm/gal), 1440 kg/m$^3$ (12.0 lbm/gal), 1500 kg/m$^3$ (12.5 lbm/gal), and 1579 kg/m$^3$ (13.16 lbm/gal). The fluids were evaluated as in Example 1. The data obtained are set forth in Table 4. The data indicate that the pre-gelatinized crosslinked waxy corn starch hydrated in the brines at ambient (room) temperature to substantially increase the low shear rate viscosity of the fluids.

TABLE 4

| | LSRV, cp | |
|---|---|---|
| Brine Density, kg/m$^3$ | Initial | HR @ 121° C. |
| 1380 | 152,000 | 104,000 |
| 1440 | 208,000 | 150,000 |

TABLE 4-continued

| | LSRV, cp | |
|---|---|---|
| Brine Density, kg/m$^3$ | Initial | HR @ 121° C. |
| 1500 | 210,000 | 173,000 |
| 1579 | 160,000 | 180,000 |

EXAMPLE 5

The pre-gelatinized crosslinked waxy corn starch of this invention, Example 1, was dispersed at 45.7 kg/m$^3$ (16 lbm/bbl) in cesium formate brines having densities of 1920 kg/m$^3$ (16 lbm/gal), 2040 kg/m$^3$ (17 lbm/gal), and 2160 kg/m$^3$ (18 lbm/gal). The fluids were evaluated as in Example 1. The data obtained are set forth in Table 5. The data indicate that the pre-gelatinized crosslinked waxy corn starch hydrated in the brines at ambient temperature to substantially increase the low shear rate viscosity of the fluids.

TABLE 5

| | LSRV, cp | |
|---|---|---|
| Brine Density, kg/m$^3$ | Initial | HR @ 121° C. |
| 1920 | 32,000 | 40,600 |
| 2040 | 39,000 | 42,000 |
| 2160 | 62,000 | 55,800 |

EXAMPLE 6

The effect of magnesium oxide on the initial high and low shear rate viscosities of a 1440 kg/m$^3$ (12.0 lbm/gal) potassium formate brine to which had been added (1) 2.86 kg/m$^3$ of xanthan gum, (2) 22.86 kg/m$^3$ of the pre-gelatinized crosslinked waxy corn starch of this invention (Example 1), or (3) both 2.86 kg/m$^3$ of xanthan gum and 22.86 kg/m$^3$ of the pre-gelatinized crosslinked waxy corn starch was evaluated. The data obtained are set forth in Table 6. The data indicate that the magnesium oxide enhanced the shear rate viscosity of the fluids, and enhanced the synergism between the xanthan gum and the pre-gelatinized crosslinked waxy corn starch as measured by the initial low shear rate viscosity.

TABLE 6

| Fluid | Concentration kg/m³ | | | Initial Fluid Rheology | |
|---|---|---|---|---|---|
| | Xanthan Gum | PXLWCS | MgO | 600 rpm, Pa | LSRV, cp. |
| 1 | 2.86 | 0 | 0 | 13.3 | 600 |
| 2 | 2.86 | 0 | 1.43 | 25.5 | 10800 |
| 3 | 2.86 | 0 | 2.86 | 31.6 | 16800 |
| 4 | 0 | 22.86 | 0 | 14.8 | 800 |
| 5 | 0 | 22.86 | 1.43 | 17.9 | 200 |
| 6 | 0 | 22.86 | 2.86 | 17.3 | 100 |
| 7 | 2.86 | 22.86 | 0 | 74.0 | 14400 |
| 8 | 2.86 | 22.86 | 1.43 | 63.8 | 20800 |
| 9 | 2.86 | 22.86 | 2.86 | 70.9 | 137000 |

EXAMPLE 7

A 1260 kg/m³ (10.5 lbm/gal) fluid was prepared containing 0.1526 kg/m³ (0.96 bbl) of a 1200 kg/m³ (10.0 lbm/gal) potassium formate brine, 2.857 kg/m³ (1 lbm/gal) xanthan gum, 22.86 kg/m³ (8 lbm/gal) of the pre-gelatinized crosslinked amylopectin of this invention (Example 1), 1.43 kg/m³ (0.5 lbm/gal) magnesium oxide, and 108.6 kg/m³ (38 lbm/gal) calcium carbonate bridging agent. The API rheology, low shear rate viscosity, pH, and fluid loss were then obtained. Thereafter the fluid was hot rolled at 137.8° C. (280° F.) for 16 hours, cooled, re-mixed, and re-tested. Also, the fluid was static aged at 165.5° C. (330° F.) for 16 hours, cooled, re-mixed, and re-tested. The data obtained are set forth in Table 7. The data indicates the excellent rheological properties, fluid loss control properties, and thermal stability of the fluids of this invention.

TABLE 7

| Fann Dial Reading @ 48.9° C. | Initial | HR @ 137.8° C. | SA @ 165.5° C. |
|---|---|---|---|
| 600 rpm | 78 | 63 | 65 |
| 300 rpm | 58 | 51 | 48 |
| 200 rpm | 40 | 46 | 40 |
| 100 rpm | 37 | 36 | 31 |
| 6 rpm | 13 | 17 | 13 |
| 3 rpm | 10 | 15 | 11 |
| API Rheology | | | |
| PV | 20 | 12 | 17 |
| YP | 38 | 39 | 31 |
| 10 sec/10 min GS | 10/13 | 17/18 | 12/13 |
| pH | 11.1 | 9.5 | 9.4 |
| LSRV($\times 10^{-3}$) | 59.5 | 61.3 | 31.4 |
| HTHP Filtrate | | | |
| Spurt Loss, ml | 2.0 | 3.0 | 2.5 |
| 30 minute, ml | 8.0 | 10.5 | 8.5 |

EXAMPLE 8

A 1752 kg/m³ (14.6 lbm/gal) fluid was prepared containing 0.1415 m³ (0.89 bbl) of a 1440 kg/m³ (12.0 lbm/gal) potassium formate brine, 2.857 kg/m³ (1 lbm/bbl) of a xanthan gum, 11.43 kg/m³ (4 lbm/bbl) of the pre-gelatinized crosslinked amylopectin of this invention (Example 1), 85.7 kg/m³ (30 lbm/bbl) of calcium carbonate bridging agents, and 382.8 kg/m³ (134 lbm/bbl) of an iron oxide weight material. The API rheology, low shear rate viscosity, pH, and fluid loss were then obtained. Thereafter the fluid was static aged at 165.5° C. (330° F.) for 16 hours, cooled, re-mixed, and re-tested. Also, the fluid was hot rolled at 137.8° C. (280° F) for 64 hours, cooled, re-mixed, and re-tested. The data obtained are set forth in Table 8. The data indicates the excellent rheological properties, fluid loss control properties, and thermal stability of the fluids of this invention.

TABLE 8

| Fann Dial Reading @ 48.9° C. | Initial | SA @ 165.5° C. | HR @ 137.8° C. |
|---|---|---|---|
| 600 rpm | 119 | 96 | 96 |
| 300 rpm | 82 | 65 | 68 |
| 200 rpm | 66 | 54 | 56 |
| 100 rpm | 48 | 34 | 42 |
| 6 rpm | 16 | 15 | 18 |
| 3 rpm | 13 | 12 | 15 |
| API Rheology | | | |
| PV | 37 | 31 | 28 |
| YP | 45 | 34 | 40 |
| 10 sec/10 min GS | 13/18 | 13/16 | 14/17 |
| pH | 10.0 | 10.0 | 9.8 |
| LSRV($\times 10^{-3}$) | 48.0 | 38.0 | 42.7 |
| HTHP Filtrate | | | |
| Spurt Loss, ml | 1.0 | Tr | 1.0 |
| 30 minute, ml | 8.0 | 8.0 | 8.5 |

What is claimed is:

1. In a well drilling and servicing fluid comprising a biopolymer viscosifier, a modified starch fluid loss control additive, and an aqueous brine having dissolved therein a formate salt selected from the group consisting of potassium formate, cesium formate, and mixtures thereof, the improvement wherein the modified starch comprises a pre-gelatinized crosslinked amylopectin starch which has been crosslinked to the extent that the viscosity of a basic aqueous amylopectin starch suspension undergoing crosslinking is within about 25% to about 60% of the maximum viscosity which can be obtained.

2. The fluid of claim 1 wherein the viscosity is from about 25% to less than about 50% of the maximum viscosity which can be obtained.

3. The fluid of claim 1 or 2 which additionally comprises a bridging agent suspended therein.

4. The fluid of claim 3 wherein the bridging agent is selected from the group consisting of potassium chloride, potassium formate, calcium carbonate, and mixtures thereof.

5. The fluid of claim 1 or 2 wherein the biopolymer is a xanthan gum.

6. The fluid of claim 1 or 2 which additionally comprises magnesium oxide.

7. The fluid of claim 1 or 2 wherein the amylopectin starch is crosslinked with epichlorohydrin.

8. The fluid of claim 1 or 2 wherein the amylopectin starch is crosslinked with epichlorohydrin and wherein the biopolymer is a xanthan gum.

9. A process of increasing the low shear rate viscosity at ambient temperatures of an aqueous brine having dissolved therein a formate salt selected from the group consisting of potassium formate, cesium formate, and mixtures thereof, which comprises adding to the brine a biopolymer and a pre-gelatinized crosslinked amylopectin starch which has been crosslinked to the extent that the viscosity of a basic aqueous amylopectin starch suspension undergoing crosslinking is within about 25% to about 60% of the maximum viscosity which can be obtained.

10. The process of claim 9 wherein the viscosity is from about 25% to less than about 50% of the maximum viscosity which can be obtained.

11. The process of claim 9 or 10 which additionally comprises adding to the brine a bridging agent.

12. The process of claim 11 wherein the bridging agent is selected from the group consisting of potassium chloride, potassium formate, calcium carbonate, and mixtures thereof.

13. The process of claim 9 or 10 wherein the biopolymer is a xanthan gum.

14. The process of claim 9 or 10 which additionally comprises adding to the brine magnesium oxide.

15. The process of claim 9 or 10 wherein the amylopectin starch is crosslinked with epichlorohydrin.

16. The process of claim 9 or 10 wherein the amylopectin starch is crosslinked with epichlorohydrin and wherein the biopolymer is a xanthan gum.

* * * * *